(No Model.)

H. J. RUTTER.
COOKING VESSEL.

No. 313,453. Patented Mar. 3, 1885.

WITNESSES:
Fred. G. Dieterich,
Arthur L. Morsell.

Hannah J. Rutter
INVENTOR.
By Louis Bagger & Co.
ATTORNEYS.

UNITED STATES PATENT OFFICE.

HANNAH JANE RUTTER, OF OAKLAND CITY, INDIANA.

COOKING-VESSEL.

SPECIFICATION forming part of Letters Patent No. 313,453, dated March 3, 1885.

Application filed July 21, 1884. (No model.)

*To all whom it may concern:*

Be it known that I, HANNAH JANE RUTTER, a citizen of the United States, and a resident of Oakland City, in the county of Gibson and State of Indiana, have invented certain new and useful Improvements in Cooking-Vessels; and I do hereby declare that the following is a full, clear, and exact description of the invention, which will enable others skilled in the art to which it appertains to make and use the same, reference being had to the accompanying drawings, which form a part of this specification, and in which—

Figure 1:
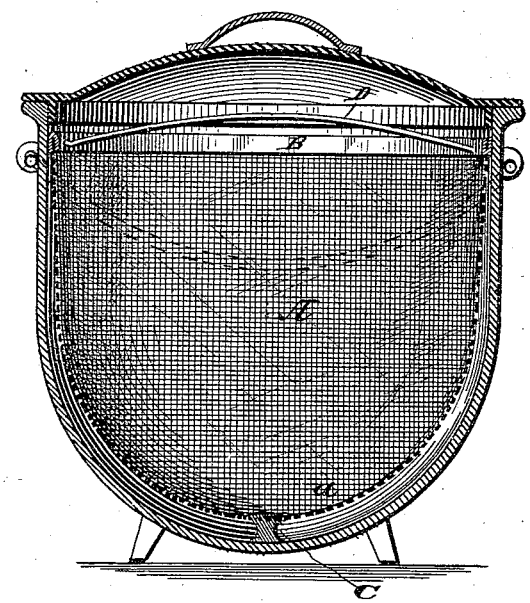
Figure 2:
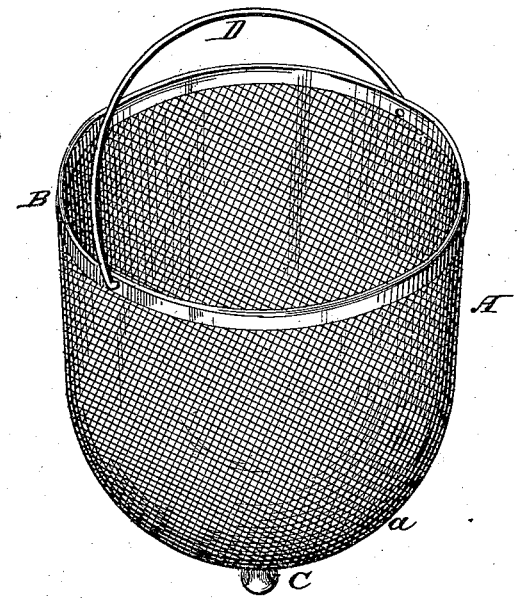

Figure 1 is a vertical sectional view showing my device applied to a stew-pot. Fig. 2 is a perspective view of the device.

My invention relates to a suitable device which may be placed in the interior of a cooking-vessel, the object of which is to prevent rice, hominy, fruit, preserves, &c., from being burned and sticking to the vessel while being cooked, substantially as will be hereinafter fully described.

In the accompanying drawings, A represents a receptacle formed of a single piece of wire-cloth having a dished bottom, $a$. B is a metallic circular rim fastened to the upper edge of the wire-cloth, preventing the same from unraveling, and it also holds the same in proper shape. C is a short leg, which prevents the receptacle A from coming in contact with the bottom of the vessel into which it is to be placed. The receptacle is also provided with a suitable bail or handle, D.

From the foregoing description, taken in connection with the drawings hereto annexed, the operation of this invention will be readily understood without further explanation.

Having thus described my invention, I claim and desire to secure by Letters Patent of the United States—

The combination, with a cooking-vessel, of a receptacle formed of a single piece of wire-cloth having a dished bottom, $a$, provided with a short leg, C, and a suitable bail or handle, as and for the purposes set forth.

In testimony that I claim the foregoing as my own I have hereunto affixed my signature in presence of two witnesses.

HANNAH JANE RUTTER.

Witnesses:
   CLOUD. L. RUTTER,
   JAMES M. COCKRUM.